United States Patent
Golitschek Edler von Elbwart et al.

(10) Patent No.: US 10,779,317 B2
(45) Date of Patent: Sep. 15, 2020

(54) AUTONOMOUS UPLINK CONFIRMATION TRIGGERING

(71) Applicant: Lenovo (Singapore) PTE. LTD., New Tech Park (SG)

(72) Inventors: Alexander Johann Maria Golitschek Edler von Elbwart, Darmstadt (DE); Joachim Loehr, Wiesbaden (DE); Prateek Basu Mallick, Langen (DE); Vijay Nangia, Woodridge, IL (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/146,767

(22) Filed: Sep. 28, 2018

(65) Prior Publication Data

US 2019/0098657 A1 Mar. 28, 2019

Related U.S. Application Data

(60) Provisional application No. 62/564,772, filed on Sep. 28, 2017.

(51) Int. Cl.
| | |
|---|---|
| *H04W 72/12* | (2009.01) |
| *H04L 1/16* | (2006.01) |
| *H04W 72/04* | (2009.01) |
| *H04W 74/08* | (2009.01) |
| *H04L 1/00* | (2006.01) |

(52) U.S. Cl.
CPC ....... *H04W 72/1289* (2013.01); *H04L 1/1614* (2013.01); *H04W 72/0453* (2013.01); *H04W 72/1242* (2013.01); *H04W 72/1284* (2013.01); *H04W 74/08* (2013.01); *H04L 1/00* (2013.01)

(58) Field of Classification Search
None
See application file for complete search history.

(56) References Cited

U.S. PATENT DOCUMENTS

| | | | |
|---|---|---|---|
| 9,775,141 B2 * | 9/2017 | Nimbalker | H04L 5/0053 |
| 2013/0128829 A1 * | 5/2013 | Sebire | H04W 72/1284 370/329 |
| 2015/0029943 A1 * | 1/2015 | Ratasuk | H04W 74/04 370/329 |
| 2018/0324766 A1 * | 11/2018 | Qiu | H04W 72/12 |

OTHER PUBLICATIONS

3GPP "LTE; Evolved Universal Terrestrial Radio Access (E-UTRA); Medium Access Control (MAC) protocol specification (3GPP TS 36.321 version 14.3.0 Release 14)", ETSI TS 136 321 V14.3.0, Jul. 2017, pp. 1-109.

(Continued)

*Primary Examiner* — James P Duffy
(74) *Attorney, Agent, or Firm* — Kunzler Bean & Adamson

(57) ABSTRACT

Apparatuses, methods, and systems are disclosed for autonomous uplink confirmation triggering. One method includes receiving an autonomous uplink command from a network unit. The method includes triggering an autonomous uplink confirmation in response to receiving the autonomous uplink command. The method includes transmitting the autonomous uplink confirmation to the network unit in response to triggering the autonomous uplink confirmation to indicate reception of the autonomous uplink command.

19 Claims, 6 Drawing Sheets

(56) References Cited

OTHER PUBLICATIONS

Huawei, Hisilicon "UL data transmission with and without SR/UL grant", 3GPP TSG WG1 NR Ad Hoc Meeting R1-1715419, Sep. 18-21, 2017, pp. 1-12.
ISR PCT, "Notification of Transmittal of the International Search Report and the Written Opinion of the International Searching Authority, or the Declaration", dated Feb. 19, 2019, pp. 1-13.
Lenovo et al., "Discussion of procedures for UL transmission with and without grant", 3GPP TSG RAN WG1 Meeting #89 R1-1707766, May 15-19, 2017, pp. 1-4.
Nokia et al., "Autonomous uplink access", 3GPP TSG-RAN WG2 #99 R2-1708483, Aug. 21-25, 2017, pp. 1-7.
Qualcomm Incorporated, "Autonomous Uplink Access for eLAA", 3GPP TSG-RAN2 Meeting #99 R2-1709631, Aug. 21-25, 2017, pp. 1-3.

\* cited by examiner

AUTONOMOUS UPLINK CONFIRMATION TRIGGERING

CROSS-REFERENCE TO RELATED APPLICATIONS

This application claims priority to U.S. Patent Application Ser. No. 62/564,772 entitled "AUTONOMOUS UPLINK COMMANDS" and filed on Sep. 28, 2017 for Alexander Johann Maria Golitschek Edler von Elbwart, which is incorporated herein by reference in its entirety.

FIELD

The subject matter disclosed herein relates generally to wireless communications and more particularly relates to autonomous uplink confirmation triggering.

BACKGROUND

The following abbreviations are herewith defined, at least some of which are referred to within the following description: Third Generation Partnership Project ("3GPP"), $5^{th}$ Generation ("5G"), Positive-Acknowledgment ("ACK"), Access Point ("AP"), Autonomous Uplink ("AUL"), Binary Phase Shift Keying ("BPSK"), Buffer Status Report ("BSR"), Cell-RNTI ("C-RNTI"), Carrier Aggregation ("CA"), Clear Channel Assessment ("CCA"), Common Control Channel ("CCCH"), Cyclic Delay Diversity ("CDD"), Code Division Multiple Access ("CDMA"), Control Element ("CE"), Closed-Loop ("CL"), Coordinated Multipoint ("CoMP"), Cyclic Prefix ("CP"), Cyclical Redundancy Check ("CRC"), Channel State Information ("CSI"), Common Search Space ("CSS"), Control Resource Set ("CORESET"), Discrete Fourier Transform Spread ("DFTS"), Downlink Control Information ("DCI"), Downlink ("DL"), Demodulation Reference Signal ("DMRS"), Data Volume and Power Headroom Report ("DPR"), Downlink Pilot Time Slot ("DwPTS"), Enhanced Clear Channel Assessment ("eCCA"), Enhanced Mobile Broadband ("eMBB"), Evolved Node B ("eNB"), Effective Isotropic Radiated Power ("EIRP"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), General Packet Radio Services ("GPRS"), Guard Period ("GP"), Global System for Mobile Communications ("GSM"), Hybrid Automatic Repeat Request ("HARQ"), International Mobile Telecommunications ("IMT"), Internet-of-Things ("IoT"), Layer 2 ("L2"), Licensed Assisted Access ("LAA"), Load Based Equipment ("LBE"), Listen-Before-Talk ("LBT"), Logical Channel ("LCH"), Logical Channel Identity ("LCD"), Logical Channel Prioritization ("LCP"), Long Term Evolution ("LTE"), Multiple Access ("MA"), Medium Access Control ("MAC"), Multimedia Broadcast Multicast Services ("MBMS"), Modulation and Coding Scheme ("MCS"), Machine Type Communication ("MTC"), massive MTC ("mMTC"), Multiple Input Multiple Output ("MIMO"), Maximum Power Reduction ("MPR"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), New Radio ("NR"), Orthogonal Frequency Division Multiplexing ("OFDM"), Open-Loop ("OL"), Power Angular Spectrum ("PAS"), Power Control ("PC"), Primary Cell ("PCell"), Primary Secondary Cell ("PSCell"), Physical Broadcast Channel ("PBCH"), Physical Downlink Control Channel ("PDCCH"), Packet Data Convergence Protocol ("PDCP"), Physical Downlink Shared Channel ("PDSCH"), Pattern Division Multiple Access ("PDMA"), Physical Hybrid ARQ Indicator Channel ("PHICH"), Power Headroom ("PH"), Power Headroom Report ("PHR"), Physical Layer ("PHY"), Physical Random Access Channel ("PRACH"), Physical Resource Block ("PRB"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Radio Access Network ("RAN"), Radio Access Technology ("RAT"), Resource Block Assignment ("RBA"), Radio Resource Control ("RRC"), Random Access Procedure ("RACH"), Random Access Response ("RAR"), Radio Link Control ("RLC"), Radio Network Temporary Identifier ("RNTI"), Reference Signal ("RS"), Remaining Minimum System Information ("RMSI"), Resource Spread Multiple Access ("RSMA"), Reference Signal Received Power ("RSRP"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Shared Channel ("SCH"), Sub-carrier Spacing ("SCS"), Service Data Unit ("SDU"), Signal-to-Interference-Plus-Noise Ratio ("SINR"), System Information Block ("SIB"), Scheduling Request ("SR"), Synchronization Signal ("SS"), Scheduled Uplink ("SUL"), Transport Block ("TB"), Transport Block Size ("TBS"), Time-Division Duplex ("TDD"), Time Division Multiplex ("TDM"), Time Division Orthogonal Cover Code ("TD-OCC"), Transmission Power Control ("TPC"), Transmission Reception Point ("TRP"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX").

In certain wireless communications networks, autonomous commands may be used. In such networks, a network may not know when an autonomous command has been received correctly.

BRIEF SUMMARY

Methods for autonomous uplink confirmation triggering are disclosed. Apparatuses and systems also perform the functions of the apparatus. One embodiment of a method includes receiving an autonomous uplink command from a network unit. In some embodiments, the method includes triggering an autonomous uplink confirmation in response to receiving the autonomous uplink command. In certain embodiments, the method includes transmitting the autonomous uplink confirmation to the network unit in response to triggering the autonomous uplink confirmation to indicate reception of the autonomous uplink command.

One apparatus for autonomous uplink confirmation triggering includes a receiver that receives an autonomous uplink command from a network unit. In certain embodiments, the apparatus includes a processor that triggers an autonomous uplink confirmation in response to receiving the autonomous uplink command. In various embodiments, a transmitter that transmits the autonomous uplink confirmation to the network unit in response to triggering the autonomous uplink confirmation to indicate reception of the autonomous uplink command.

One method for autonomous uplink confirmation triggering includes transmitting an autonomous uplink command to a remote unit. In various embodiments, the autonomous uplink command triggers an autonomous uplink confirmation. In some embodiments, the method includes receiving the autonomous uplink confirmation in response to the autonomous uplink confirmation being triggered to indicate that the remote unit received the autonomous uplink command.

One apparatus for autonomous uplink confirmation triggering includes a transmitter that transmits an autonomous uplink command to a remote unit. In some embodiments, the autonomous uplink command triggers an autonomous uplink confirmation. In certain embodiments, the apparatus includes a receiver that receives the autonomous uplink confirmation in response to the autonomous uplink confirmation being triggered to indicate that the remote unit received the autonomous uplink command.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
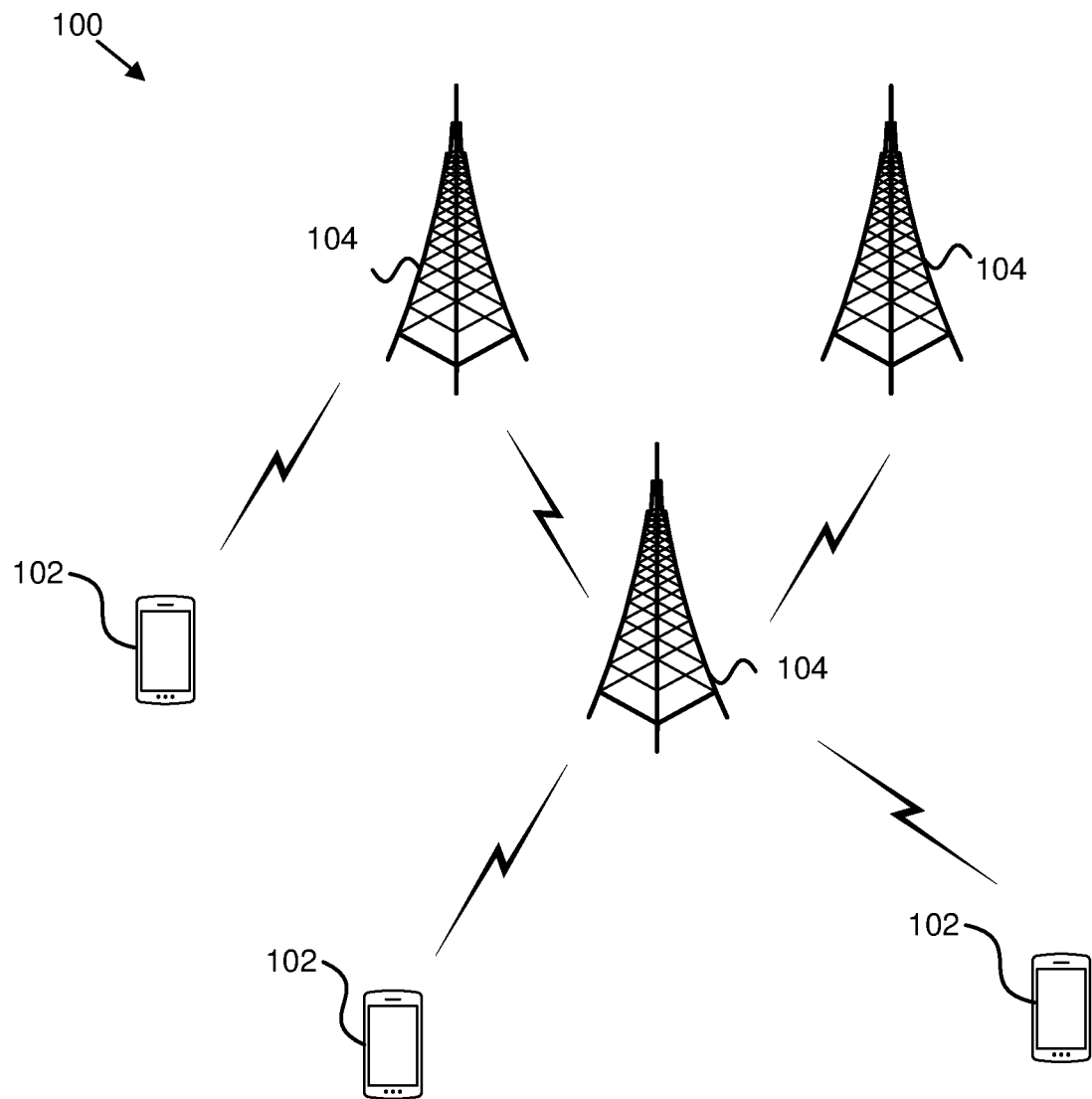
FIG. 1 is a schematic block diagram illustrating one embodiment of a wireless communication system for autonomous uplink confirmation triggering.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for autonomous uplink confirmation triggering. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a remote unit 102 may be used for autonomous uplink confirmation triggering. The remote unit 102 may receive an autonomous uplink command from a network unit 104. In some embodiments, the remote unit 102 may trigger an autonomous uplink confirmation in response to receiving the autonomous uplink command. In certain embodiments, the remote unit 102 may transmit the autonomous uplink confirmation to the network unit 104 in response to triggering the autonomous uplink confirmation to indicate reception of the autonomous uplink command. Accordingly, the remote unit 102 may be used for autonomous uplink confirmation triggering.

In certain embodiments, a network unit 104 may be used for autonomous uplink confirmation triggering. In some embodiments, the network unit 104 may transmit an autonomous uplink command to a remote unit 102. In various embodiments, the autonomous uplink command triggers an autonomous uplink confirmation. In some embodiments, the network unit 104 may receive the autonomous uplink confirmation in response to the autonomous uplink confirmation being triggered to indicate that the remote unit received the autonomous uplink command. Accordingly, the network unit 104 may be used for autonomous uplink confirmation triggering.

Figure 2:
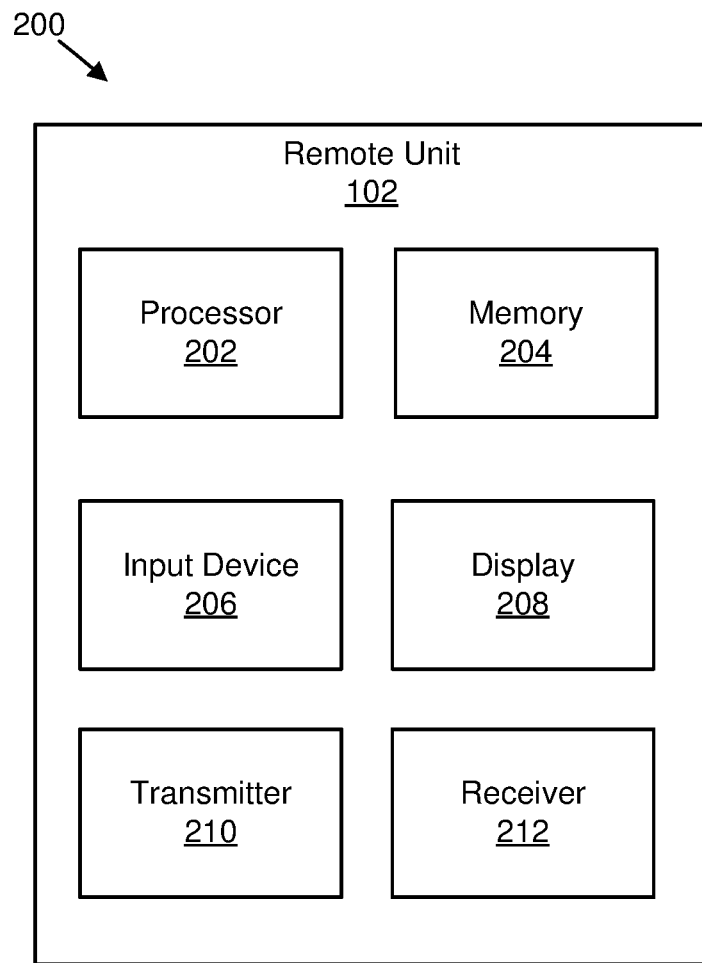
FIG. 2 is a schematic block diagram illustrating one embodiment of an apparatus that may be used for autonomous uplink confirmation triggering.

FIG. 2 depicts one embodiment of an apparatus 200 that may be used for autonomous uplink confirmation triggering. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 may trigger an autonomous uplink confirmation in response to receiving an autonomous uplink command. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. In some embodiments, the receiver 212 receives an autonomous uplink command from a network unit 104. In certain embodiments, the transmitter 210 transmits an autonomous uplink confirmation to the network unit 104 in response to triggering the autonomous uplink confirmation to indicate reception of the autonomous uplink command. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
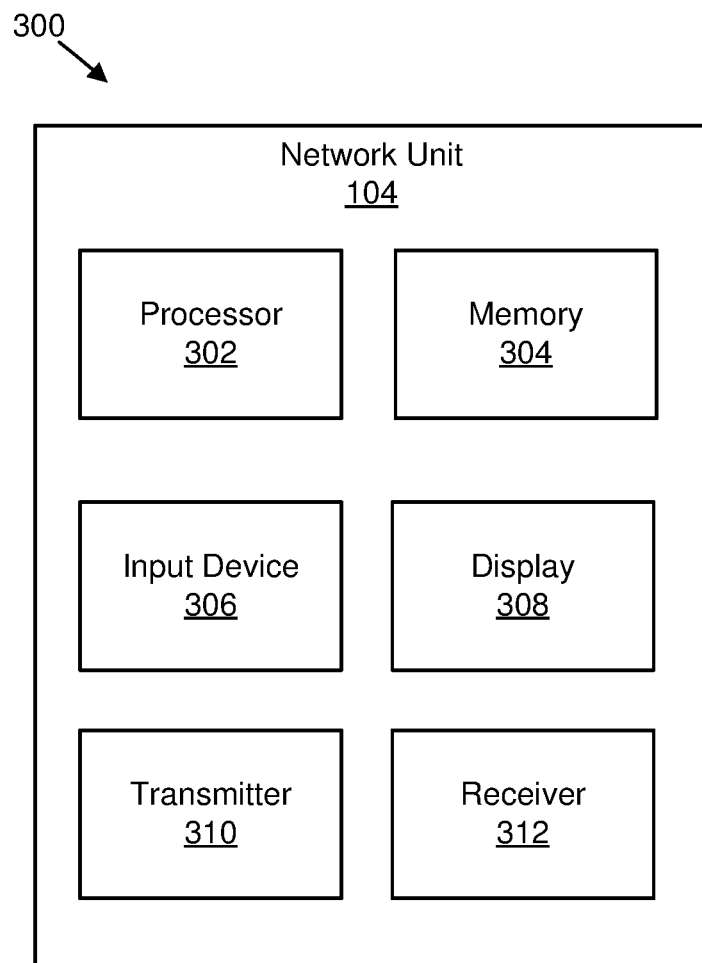
FIG. 3 is a schematic block diagram illustrating one embodiment of an apparatus that may be used for autonomous uplink confirmation triggering.

FIG. 3 depicts one embodiment of an apparatus 300 that may be used for autonomous uplink confirmation triggering. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the transmitter 310 may transmit an autonomous uplink command to a remote unit 102. In some embodiments, the autonomous uplink command triggers an autonomous uplink confirmation. In certain embodiments, the receiver 312 may receive the autonomous uplink confirmation in response to the autonomous uplink confirmation being triggered to indicate that the remote unit received the autonomous uplink command. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In certain configurations involving AUL transmissions, a remote unit 102 receives only a DCI to activate and/or deactivate an AUL transmission. In some configurations, the activation DCI includes parameters for uplink transmissions such as a RBA and an MCS. After activation, any AUL transmissions are done without new DCI whenever the remote unit 102 can access the channel and has data in its transmit buffer. In various configurations, the deactivation DCI disables AUL transmissions on that carrier. After deactivation the remote unit 102 will only transmit uplink transmission after having received an explicit scheduling grant.

As may be appreciated, both activation and deactivation DCI messages may be subject to noise or collisions on a wireless channel. This may result in the remote unit 102 missing a corresponding command. Furthermore, the remote unit 102 may be susceptible to false alarms if the remote unit 102 detects an activation or deactivation DCI in channel noise even though a network unit 104 did not transmit and/or intend such a command. With noise, collisions, and/or false alarms, the network unit 104 and the remote unit 102 have a different understanding about whether autonomous transmissions are activated or deactivated. This different understanding may lead to data loss, excessive transmission delays, unnecessary unlicensed spectrum occupancy, fairness problems, coexistence problems, and/or wasted battery power. In some embodiments, an autonomous uplink confirmation sent by the remote unit 102 may overcome such problems. The remote unit 102 may send the autonomous uplink confirmation in response to detecting an activation DCI and/or a deactivation DCI.

In some configurations, after deactivation, the remote unit 102 may depend on scheduled grants for any subsequent uplink transmissions. This may lead to a higher latency for the remote unit 102 that has a substantial amount of data in its uplink transmit buffer. In some embodiments, the remote unit 102 may trigger a BSR in response to the AUL being deactivated.

In various embodiments, activation and/or deactivation of AUL may be acknowledged by a MAC CE identified by a specified reserved LCD field using an autonomous uplink confirmation. In such embodiments, because the acknowledgement is generated and processed by a MAC, the acknowledgement may be transmitted on any available uplink carrier, such as PCell or any other licensed carrier. Therefore, in such embodiments, there may not be a problem of a blocked unlicensed carrier for the transmission of the autonomous uplink confirmation. It should be noted, however, that there are various scenarios where no licensed carrier is available for communication, so it should be understood that various embodiments described herein are applicable to those scenarios as well.

In one embodiment, reception of an AUL activation DCI and/or the reception of an AUL deactivation DCI triggers an AUL confirmation. In such embodiments, the AUL confirmation via a MAC CE may be transmitted on an uplink carrier as soon as possible after receiving the AUL activation DCI and/or the AUL deactivation DCI. Moreover, the AUL confirmation may be transmitted on a licensed carrier rather than on an unlicensed carrier to avoid contention on the unlicensed carrier with other transmission nodes (e.g., such as Wi-Fi® nodes, other remote units 102, and so forth). In some embodiments, for a logical channel prioritization procedure, the MAC entity shall consider a relative priority of the MAC CE for AUL confirmation higher than: a MAC control element for a BSR, with the exception of a BSR included for padding; a MAC control element for a PHR, an extended PHR, or a dual connectivity PHR; a MAC control element for a sidelink BSR, with the exception of a sidelink BSR included for padding; data from any logical channel except for data from an UL-CCCH; a MAC control element for a recommended bit rate query; a MAC control element for a BSR included for padding; a MAC control element for a sidelink BSR included for padding; data from a logical channel conveying non-delay-critical services such as eMBB; and/or data from a logical channel conveying mMTC services.

Moreover, in some embodiments, certain MAC control elements may have a higher relative priority than a MAC control element for an AUL confirmation. Therefore, in such embodiments, for a logical channel prioritization procedure, the MAC entity shall consider the relative priority of a MAC control element for an AUL confirmation lower than: a MAC control element for C-RNTI or data from UL-CCCH; a MAC control element for a DPR; and/or data from a logical channel conveying delay-critical services such as URLLC.

In various embodiments, a MAC CE for AUL confirmation may encompass multiple autonomous uplink confirmations in a multicarrier scenario. For example, if a network unit 104 intends to activate AUL on two unlicensed carriers at the same time, a single MAC CE may carry both autonomous uplink confirmations. For this purpose, in one embodiment, a MAC CE may contain a bitmap with one bit per activated or configured component carrier. In such an embodiment, a first value (e.g., 0) may indicate an autonomous uplink confirmation of a deactivation or simply that AUL is deactivated for a carrier, and a second value (e.g., 1) may indicate the autonomous uplink confirmation of an activation or simply that AUL is activated for the carrier. In another embodiment, a MAC CE may contain a carrier identifier field (e.g., with a corresponding cell ID) and a bit to indicate an activation and/or deactivation state as in the bitmap described. In certain embodiments, a bitmap or carrier identifier field may be used to indicate a bandwidth part ID, or an AUL configuration ID. For example, RRC may configure a set of AUL parameters identified and referred to by an AUL configuration ID, and an activation DCI and/or a deactivation DCI may explicitly indicate the AUL configuration ID to indicate which parameters are to be used for AUL. The parameters may include, for example, time domain resources and/or a list of HARQ process IDs allowed for AUL operation.

In various embodiments, reception of a deactivation DCI may trigger generation of a BSR. In some embodiments, after deactivation of AUL, a remote unit 102 may transmit its data on an unlicensed carrier only if it receives an uplink grant. However, in such embodiments, a network unit 104 may not know how much data the remote unit 102 still has in its transmission buffer. Therefore, it may take a certain amount of time before sufficient UL grants are sent to the remote unit 102 to enable the remote unit 102 to transmit its remaining data. By triggering a BSR upon deactivation of AUL, the network unit 104 may immediately get a BSR, and may consequently better determine a number of grants and granted resources needed by the remote unit 102. This may reduce delay and/or channel occupancy. Moreover, a triggering the BSR may be beneficial if no autonomous uplink confirmation is transmitted by the remote unit 102.

In certain embodiments, a pending MAC CE for AUL confirmation triggers a SR. This may be helpful to obtain an immediate UL grant that can be used to convey the MAC CE for AUL confirmation. The MAC CE may be treated as a delay-critical data service such as URLLC for handling by logical channel prioritization (e.g., its transmission can have relative priority over other MAC control elements and/or data).

In some embodiments, a confirmation is conveyed by something besides a MAC control element, such as an acknowledgement on a physical layer (e.g., via PUCCH). To determine a physical layer resource for the transmission of the confirmation, the remote unit 102 may use the resource of corresponding activation or deactivation DCI. In various embodiments, activation or deactivation DCI content indicates a confirmation resource. In certain embodiments, the remote unit 102 determines a confirmation resource from a predefined configuration, such as an RRC message. In some embodiments, a confirmation resource may be on a PCell, a PSCell, and/or on an unlicensed cell in which AUL is activated. It may be beneficial to have the confirmation resource on an unlicensed cell if one or more unlicensed cells are active at a time of transmission of the confirmation.

In various embodiments, AUL activation or AUL deactivation commands are not received as a physical layer command such as a DCI, but as a downlink MAC control element, or an RRC message. As may be appreciated, methods for transmitting a confirmation message, as well as potential results, such as triggering a BSR or SR, can be implemented regardless of the transmission method of the AUL activation or deactivation command.

In certain embodiments, an activation and/or deactivation command can be specific for a remote unit 102. For example, the activation and/or deactivation command may be conveyed by DCI, a MAC control element, or an RRC message that is addressing only a single remote unit 102. In some embodiments, from a network's perspective, to activate or deactivate AUL for multiple remote units 102 at the same time, multiple AUL activation or deactivation DCIs, MAC control elements, or RRC messages may be sent. In various embodiments, a single DCI, MAC control element, or RRC message may carry multiple activation or deactivation commands (e.g., addressed to multiple remote units 102). In such embodiments, the remote unit 102 may be informed ahead of time about which commands are applicable to itself (e.g., by an index in the command), or the remote unit 102 may be able to determine the command by a known rule (e.g., based on its ID).

In certain embodiments, an AUL may be activated for a limited set of service classes or with a set of limits for which a remote unit 102 may autonomously access the unlicensed carrier. These limits may include: 1) the AUL carries only data from delay-critical services (e.g., URLLC). This may be useful at times in which there are not too many remote units 102 in the cell (e.g., light load), where the AUL can offer a smaller latency since there is no delay between a resource grant and the UL transmission; 2) the AUL carries only data from non-delay-critical services (e.g., eMBB). This may be useful at times in which many nodes are contending for the unlicensed spectrum, so that the risk of collision and consequently for higher latency or more HARQ retransmissions becomes high. In such a scenario, delay-critical data should not be transmitted by AUL—on the other hand non-delay-critical data may tolerate the risks; 3) the AUL carries only data packets smaller than a specific threshold (e.g., mMTC). This may be beneficial at times in which frequency domain multiplexing of multiple remote units 102 with activated AUL is possible, so that multiple remote units 102 can transmit on the unlicensed carrier at the same time without interfering each other's transmission. This scenario may be particularly applicable when a node (such as eNB or gNB) can reserve a time interval on the unlicensed carrier, so that within that interval there is no risk for transmission by other nodes or radio technologies and consequently a remote unit 102 does not need to perform channel sensing and/or listen-before-talk, or performs these for a smaller timespan or on limited frequency resources compared to the channel sensing and/or listen-before-talk in cases in which no such time interval reservation can be established; 4) the AUL carries only data packets larger than a specific threshold (e.g., eMBB). This may be beneficial at times in which frequency domain multiplexing of multiple remote units 102 with activated AUL is not possible, and rather a single remote unit 102 should transmit as much data as possible at times in which it can obtain the channel; and/or 5) limitations (above or below) for one or more of the following: resource block limit, transport block size limit, TTI length (e.g., minislot, slot, subframe), and/or subcarrier spacing.

Figure 4:
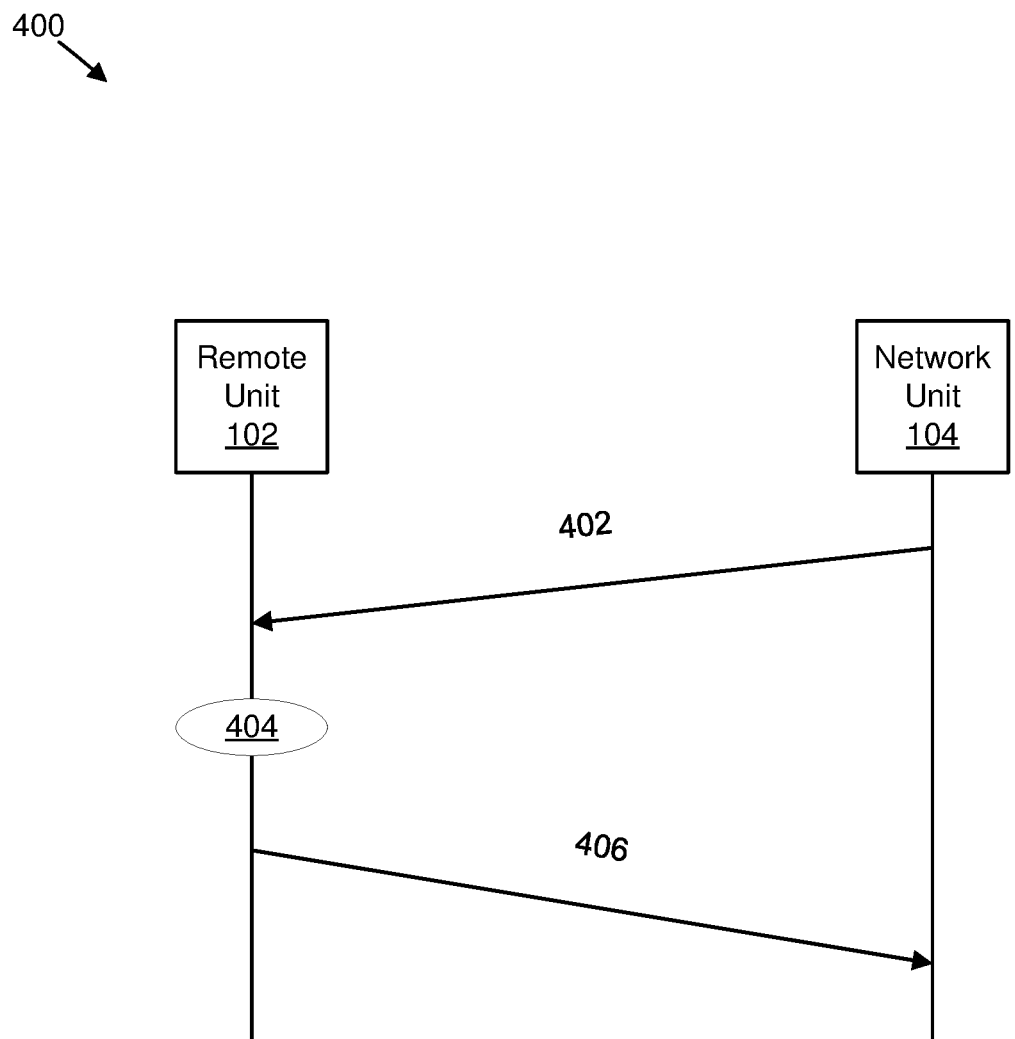
FIG. 4 is a schematic block diagram illustrating one embodiment of communications between a remote unit and a network unit.

FIG. 4 is a schematic block diagram illustrating one embodiment of communications 400 between the remote unit 102 and the network unit 104. Specifically, the communications 400 include a first communication 402 from the network unit 104 to the remote unit 102. In the first communication 402, the network unit 104 transmits an autonomous uplink command. The remote unit 102 receives the autonomous uplink command from the network unit 104 and triggers 404 an autonomous uplink confirmation in response to receiving the autonomous uplink command. The communications 400 also include a second communication 406 from the remote unit 102 to the network unit 104. In the second communication 406, the remote unit 102 transmits the autonomous uplink confirmation 404 to the network unit 104 in response to triggering the autonomous uplink confirmation to indicate reception of the autonomous uplink command.

Figure 5:
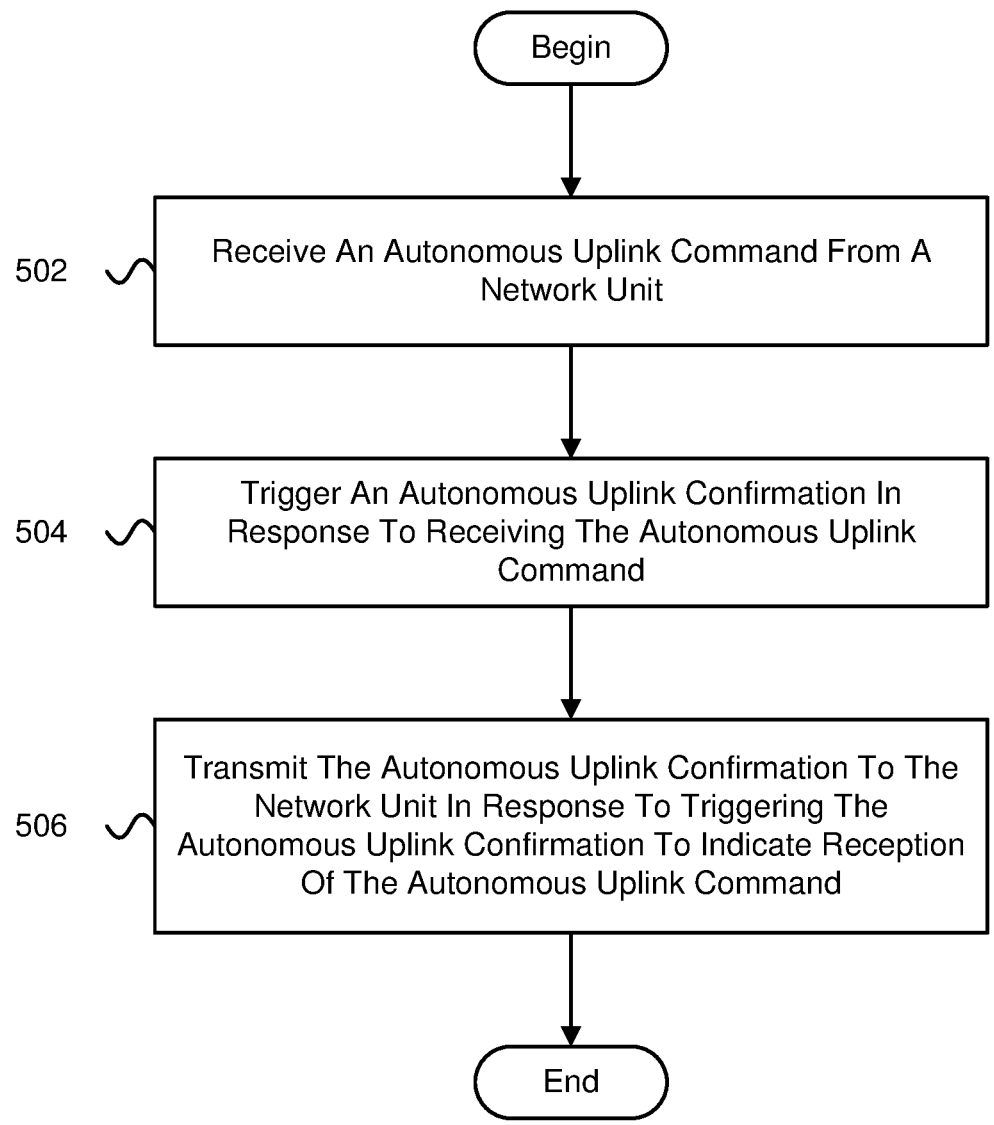
FIG. 5 is a flow chart diagram illustrating one embodiment of a method for autonomous uplink confirmation triggering.

FIG. 5 is a flow chart diagram illustrating one embodiment of a method 500 for autonomous uplink confirmation triggering. In some embodiments, the method 500 is performed by an apparatus, such as the remote unit 102. In certain embodiments, the method 500 may be performed by a processor executing program code, for example, a microcontroller, a microprocessor, a CPU, a GPU, an auxiliary processing unit, a FPGA, or the like.

The method 500 may include receiving 502 an autonomous uplink command from a network unit 104. In some embodiments, the method 500 includes triggering 504 an autonomous uplink confirmation in response to receiving the autonomous uplink command. In certain embodiments, the method 500 includes transmitting 506 the autonomous uplink confirmation to the network unit in response to triggering the autonomous uplink confirmation to indicate reception of the autonomous uplink command.

In certain embodiments, the autonomous uplink command includes an autonomous uplink activation command or an autonomous uplink deactivation command. In some embodiments, the autonomous uplink command is received in downlink control information. In various embodiments, the autonomous uplink confirmation is transmitted via a medium access control control element.

In one embodiment, the autonomous uplink confirmation includes a bitmap, and each bit of the bitmap represents either a configured uplink resource or an activated uplink resource. In certain embodiments, the configured uplink resource or the activated uplink resource corresponds to a cell, a carrier, a bandwidth part, or a combination thereof. In some embodiments, the autonomous uplink confirmation includes a resource identification and a bit corresponding to the resource identification.

In various embodiments, the bit indicates a status, activation, deactivation, or a combination thereof. In one embodiment, the autonomous uplink confirmation includes an identifier representing one of a plurality of transmission parameters, and the plurality of transmission parameters include time domain resources, hybrid automatic repeat request process identifiers, or a combination thereof.

In certain embodiments, the autonomous uplink confirmation has a higher transmission priority than: a medium access control control element for a buffer status report excluding a buffer status report included for padding; a medium access control control element for a power headroom report, an extended power headroom report, a dual connectivity power headroom report, or a combination thereof; a medium access control control element for a sidelink buffer status report excluding a sidelink buffer status report included for padding; data from a logical channel excluding data from an uplink common control channel; a medium access control control element for a recommended bit rate query; a medium access control control element for a buffer status report included for padding; a medium access control control element for a sidelink buffer status report included for padding; data from a logical channel conveying non-delay-critical services; data from a logical channel conveying massive machine type communications services; or some combination thereof.

In some embodiments, the autonomous uplink confirmation has a higher transmission priority than: a medium access control control element for a buffer status report excluding a buffer status report included for padding; a medium access control control element for a power headroom report, an extended power headroom report, a dual connectivity power headroom report, or a combination thereof; a medium access control control element for a sidelink buffer status report excluding a sidelink buffer status report included for padding; data from a logical channel excluding data from an uplink common control channel; a medium access control control element for a recommended bit rate query; a medium access control control element for a buffer status report included for padding; and a medium access control control element for a sidelink buffer status report included for padding.

In various embodiments, the autonomous uplink confirmation has a relative transmission priority lower than: a medium access control control element for a cell radio temporary network identifier; data from an uplink control channel; a medium access control control element for a data volume and power headroom report; data from a logical channel conveying delay-critical services; or some combination thereof.

In one embodiment, the autonomous uplink confirmation has a relative transmission priority lower than: a medium access control control element for a cell radio temporary network identifier; data from an uplink control channel; and a medium access control control element for a data volume and power headroom report.

In certain embodiments, the reception of the autonomous uplink command triggers a scheduling request. In some embodiments, the autonomous uplink command includes an autonomous uplink deactivation command, and receiving the autonomous uplink command triggers a buffer status report.

Figure 6:
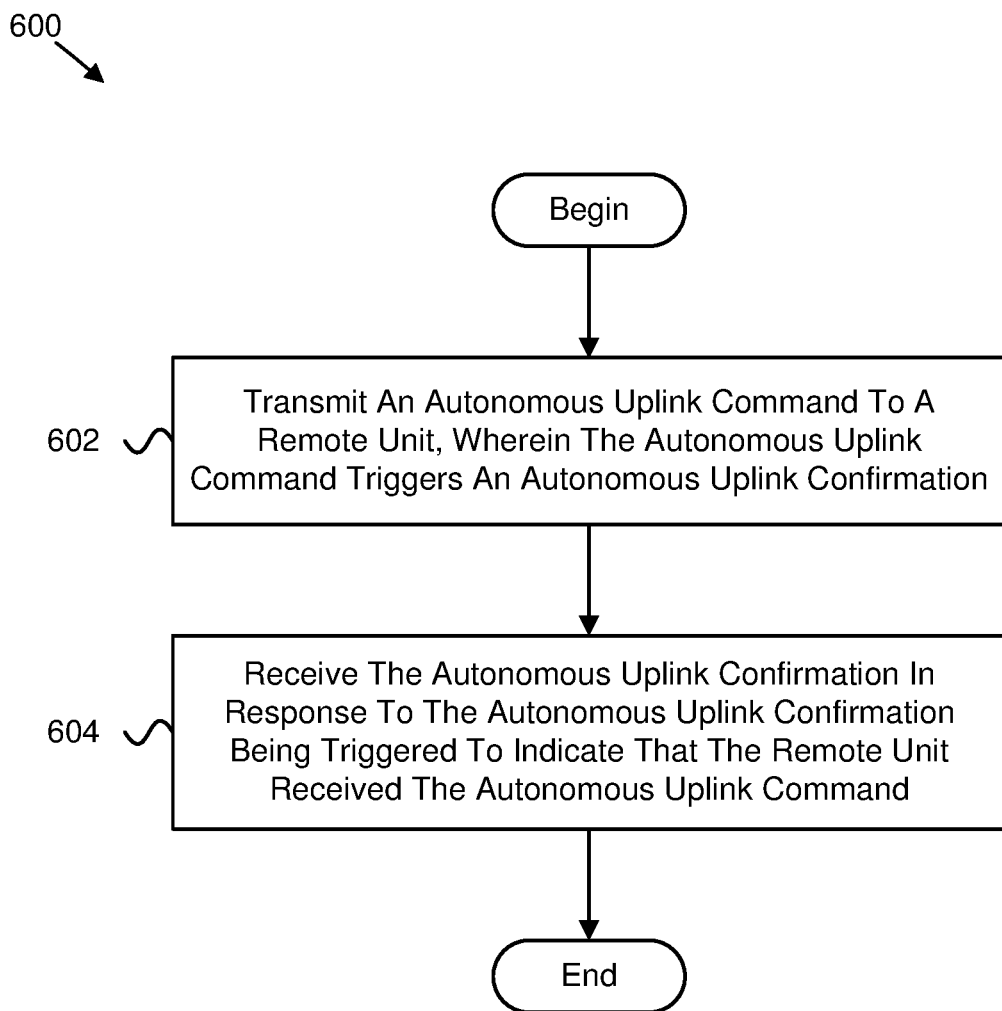
FIG. 6 is a flow chart diagram illustrating another embodiment of a method for autonomous uplink confirmation triggering.

FIG. 6 is a flow chart diagram illustrating another embodiment of a method 600 for autonomous uplink confirmation triggering. In some embodiments, the method 600 is performed by an apparatus, such as the network unit 104. In certain embodiments, the method 600 may be performed by a processor executing program code, for example, a microcontroller, a microprocessor, a CPU, a GPU, an auxiliary processing unit, a FPGA, or the like.

The method 600 may include transmitting 602 an autonomous uplink command to a remote unit. In various embodiments, the autonomous uplink command triggers an autonomous uplink confirmation. In some embodiments, the method 600 includes receiving 604 the autonomous uplink confirmation in response to the autonomous uplink confirmation being triggered to indicate that the remote unit received the autonomous uplink command.

In certain embodiments, the autonomous uplink command includes an autonomous uplink activation command or an autonomous uplink deactivation command. In some embodiments, the autonomous uplink command is transmitted in downlink control information. In various embodiments, the autonomous uplink confirmation is received via a medium access control control element.

In one embodiment, the autonomous uplink confirmation includes a bitmap, and each bit of the bitmap represents either a configured uplink resource or an activated uplink resource. In certain embodiments, the configured uplink resource or the activated uplink resource corresponds to a cell, a carrier, a bandwidth part, or a combination thereof. In some embodiments, the autonomous uplink confirmation includes a resource identification and a bit corresponding to the resource identification.

In various embodiments, the bit indicates a status, activation, deactivation, or a combination thereof. In one embodiment, the autonomous uplink confirmation includes an identifier representing one of a plurality of transmission parameters, and the plurality of transmission parameters include time domain resources, hybrid automatic repeat request process identifiers, or a combination thereof. In certain embodiments, the autonomous uplink command comprises an autonomous uplink deactivation command, and the autonomous uplink command triggers a buffer status report.

In one embodiment, a method comprises: receiving an autonomous uplink command from a network unit; triggering an autonomous uplink confirmation in response to receiving the autonomous uplink command; and transmitting the autonomous uplink confirmation to the network unit in response to triggering the autonomous uplink confirmation to indicate reception of the autonomous uplink command.

In certain embodiments, the autonomous uplink command comprises an autonomous uplink activation command or an autonomous uplink deactivation command.

In some embodiments, the autonomous uplink command is received in downlink control information.

In various embodiments, the autonomous uplink confirmation is transmitted via a medium access control control element.

In one embodiment, the autonomous uplink confirmation includes a bitmap, and each bit of the bitmap represents either a configured uplink resource or an activated uplink resource.

In certain embodiments, the configured uplink resource or the activated uplink resource corresponds to a cell, a carrier, a bandwidth part, or a combination thereof.

In some embodiments, the autonomous uplink confirmation includes a resource identification and a bit corresponding to the resource identification.

In various embodiments, the bit indicates a status, activation, deactivation, or a combination thereof.

In one embodiment, the autonomous uplink confirmation includes an identifier representing one of a plurality of transmission parameters, and the plurality of transmission parameters include time domain resources, hybrid automatic repeat request process identifiers, or a combination thereof.

In certain embodiments, the autonomous uplink confirmation has a higher transmission priority than: a medium access control control element for a buffer status report excluding a buffer status report included for padding; a medium access control control element for a power headroom report, an extended power headroom report, a dual connectivity power headroom report, or a combination thereof; a medium access control control element for a sidelink buffer status report excluding a sidelink buffer status report included for padding; data from a logical channel excluding data from an uplink common control channel; a medium access control control element for a recommended bit rate query; a medium access control control element for a buffer status report included for padding; a medium access control control element for a sidelink buffer status report included for padding; data from a logical channel conveying non-delay-critical services; data from a logical channel conveying massive machine type communications services; or some combination thereof.

In some embodiments, the autonomous uplink confirmation has a higher transmission priority than: a medium access control control element for a buffer status report excluding a buffer status report included for padding; a medium access control control element for a power headroom report, an extended power headroom report, a dual connectivity power headroom report, or a combination thereof; a medium access control control element for a sidelink buffer status report excluding a sidelink buffer status report included for padding; data from a logical channel excluding data from an uplink common control channel; a medium access control control element for a recommended bit rate query; a medium access control control element for a buffer status report included for padding; and a medium access control control element for a sidelink buffer status report included for padding.

In various embodiments, the autonomous uplink confirmation has a relative transmission priority lower than: a medium access control control element for a cell radio temporary network identifier; data from an uplink control channel; a medium access control control element for a data volume and power headroom report; data from a logical channel conveying delay-critical services; or some combination thereof.

In one embodiment, the autonomous uplink confirmation has a relative transmission priority lower than: a medium access control control element for a cell radio temporary network identifier; data from an uplink control channel; and a medium access control control element for a data volume and power headroom report.

In certain embodiments, the reception of the autonomous uplink command triggers a scheduling request.

In some embodiments, the autonomous uplink command comprises an autonomous uplink deactivation command, and receiving the autonomous uplink command triggers a buffer status report.

In one embodiment, an apparatus comprises: a receiver that receives an autonomous uplink command from a network unit; a processor that triggers an autonomous uplink confirmation in response to receiving the autonomous uplink command; and a transmitter that transmits the autonomous uplink confirmation to the network unit in response to triggering the autonomous uplink confirmation to indicate reception of the autonomous uplink command.

In certain embodiments, the autonomous uplink command comprises an autonomous uplink activation command or an autonomous uplink deactivation command.

In some embodiments, the autonomous uplink command is received in downlink control information.

In various embodiments, the autonomous uplink confirmation is transmitted via a medium access control control element.

In one embodiment, the autonomous uplink confirmation includes a bitmap, and each bit of the bitmap represents either a configured uplink resource or an activated uplink resource.

In certain embodiments, the configured uplink resource or the activated uplink resource corresponds to a cell, a carrier, a bandwidth part, or a combination thereof.

In some embodiments, the autonomous uplink confirmation includes a resource identification and a bit corresponding to the resource identification.

In various embodiments, the bit indicates a status, activation, deactivation, or a combination thereof.

In one embodiment, the autonomous uplink confirmation includes an identifier representing one of a plurality of transmission parameters, and the plurality of transmission parameters include time domain resources, hybrid automatic repeat request process identifiers, or a combination thereof.

In certain embodiments, the autonomous uplink confirmation has a higher transmission priority than: a medium access control control element for a buffer status report excluding a buffer status report included for padding; a medium access control control element for a power headroom report, an extended power headroom report, a dual connectivity power headroom report, or a combination thereof; a medium access control control element for a sidelink buffer status report excluding a sidelink buffer status report included for padding; data from a logical channel excluding data from an uplink common control channel; a medium access control control element for a recommended bit rate query; a medium access control control element for a buffer status report included for padding; a medium access control control element for a sidelink buffer status report included for padding; data from a logical channel conveying non-delay-critical services; data from a logical channel conveying massive machine type communications services; or some combination thereof.

In some embodiments, the autonomous uplink confirmation has a higher transmission priority than: a medium access control control element for a buffer status report excluding a buffer status report included for padding; a medium access control control element for a power headroom report, an extended power headroom report, a dual connectivity power headroom report, or a combination thereof; a medium access control control element for a sidelink buffer status report excluding a sidelink buffer status report included for padding; data from a logical channel excluding data from an uplink common control channel; a medium access control control element for a recommended bit rate query; a medium access control control element for a buffer status report included for padding; and a medium access control control element for a sidelink buffer status report included for padding.

In various embodiments, the autonomous uplink confirmation has a relative transmission priority lower than: a medium access control control element for a cell radio temporary network identifier; data from an uplink control channel; a medium access control control element for a data volume and power headroom report; data from a logical channel conveying delay-critical services; or some combination thereof.

In one embodiment, the autonomous uplink confirmation has a relative transmission priority lower than: a medium access control control element for a cell radio temporary network identifier; data from an uplink control channel; and a medium access control control element for a data volume and power headroom report.

In certain embodiments, the reception of the autonomous uplink command triggers a scheduling request.

In some embodiments, the autonomous uplink command comprises an autonomous uplink deactivation command, and receiving the autonomous uplink command triggers a buffer status report.

In one embodiment, a method comprises: transmitting an autonomous uplink command to a remote unit, wherein the autonomous uplink command triggers an autonomous uplink confirmation; and receiving the autonomous uplink confirmation in response to the autonomous uplink confirmation being triggered to indicate that the remote unit received the autonomous uplink command.

In certain embodiments, the autonomous uplink command comprises an autonomous uplink activation command or an autonomous uplink deactivation command.

In some embodiments, the autonomous uplink command is transmitted in downlink control information.

In various embodiments, the autonomous uplink confirmation is received via a medium access control control element.

In one embodiment, the autonomous uplink confirmation includes a bitmap, and each bit of the bitmap represents either a configured uplink resource or an activated uplink resource.

In certain embodiments, the configured uplink resource or the activated uplink resource corresponds to a cell, a carrier, a bandwidth part, or a combination thereof.

In some embodiments, the autonomous uplink confirmation includes a resource identification and a bit corresponding to the resource identification.

In various embodiments, the bit indicates a status, activation, deactivation, or a combination thereof.

In one embodiment, the autonomous uplink confirmation includes an identifier representing one of a plurality of transmission parameters, and the plurality of transmission parameters include time domain resources, hybrid automatic repeat request process identifiers, or a combination thereof.

In certain embodiments, the autonomous uplink command comprises an autonomous uplink deactivation command, and the autonomous uplink command triggers a buffer status report.

In one embodiment, an apparatus comprises: a transmitter that transmits an autonomous uplink command to a remote unit, wherein the autonomous uplink command triggers an autonomous uplink confirmation; and a receiver that receives the autonomous uplink confirmation in response to the autonomous uplink confirmation being triggered to indicate that the remote unit received the autonomous uplink command.

In certain embodiments, the autonomous uplink command comprises an autonomous uplink activation command or an autonomous uplink deactivation command.

In some embodiments, the autonomous uplink command is transmitted in downlink control information.

In various embodiments, the autonomous uplink confirmation is received via a medium access control control element.

In one embodiment, the autonomous uplink confirmation includes a bitmap, and each bit of the bitmap represents either a configured uplink resource or an activated uplink resource.

In certain embodiments, the configured uplink resource or the activated uplink resource corresponds to a cell, a carrier, a bandwidth part, or a combination thereof.

In some embodiments, the autonomous uplink confirmation includes a resource identification and a bit corresponding to the resource identification.

In various embodiments, the bit indicates a status, activation, deactivation, or a combination thereof.

In one embodiment, the autonomous uplink confirmation includes an identifier representing one of a plurality of transmission parameters, and the plurality of transmission parameters include time domain resources, hybrid automatic repeat request process identifiers, or a combination thereof.

In certain embodiments, the autonomous uplink command comprises an autonomous uplink deactivation command, and the autonomous uplink command triggers a buffer status report.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
    receiving an autonomous uplink command from a network unit;
    triggering an autonomous uplink confirmation in response to receiving the autonomous uplink command; and
    transmitting the autonomous uplink confirmation to the network unit in response to triggering the autonomous uplink confirmation to indicate reception of the autonomous uplink command, wherein the autonomous uplink confirmation is transmitted via a medium access control control element, and the autonomous uplink confirmation has a relative transmission priority lower than:
        a medium access control control element for a cell radio temporary network identifier; and
        data from an uplink control channel.

2. The method of claim 1, wherein the autonomous uplink command comprises an autonomous uplink activation command or an autonomous uplink deactivation command.

3. The method of claim 1, wherein the autonomous uplink command is received in downlink control information.

4. The method of claim 1, wherein the autonomous uplink confirmation includes a bitmap, and each bit of the bitmap represents either a configured uplink resource or an activated uplink resource.

5. The method of claim 4, wherein the configured uplink resource or the activated uplink resource corresponds to a cell, a carrier, a bandwidth part, or a combination thereof.

6. The method of claim 1, wherein the autonomous uplink confirmation includes a resource identification and a bit corresponding to the resource identification.

7. The method of claim 6, wherein the bit indicates a status, activation, deactivation, or a combination thereof.

8. The method of claim 1, wherein the autonomous uplink confirmation includes an identifier representing one of a plurality of transmission parameters, and the plurality of transmission parameters include time domain resources, hybrid automatic repeat request process identifiers, or a combination thereof.

9. The method of claim 1, wherein the autonomous uplink confirmation has a higher transmission priority than:
    a medium access control control element for a buffer status report excluding a buffer status report included for padding;
    a medium access control control element for a power headroom report, an extended power headroom report, a dual connectivity power headroom report, or a combination thereof;
    a medium access control control element for a sidelink buffer status report excluding a sidelink buffer status report included for padding;
    data from a logical channel excluding data from an uplink common control channel;
    a medium access control control element for a recommended bit rate query;
    a medium access control control element for a buffer status report included for padding;
    a medium access control control element for a sidelink buffer status report included for padding;
    data from a logical channel conveying non-delay-critical services;
    data from a logical channel conveying massive machine type communications services;
    or some combination thereof.

10. The method of claim 1, wherein the autonomous uplink confirmation has a higher transmission priority than:
    a medium access control control element for a buffer status report excluding a buffer status report included for padding;
    a medium access control control element for a power headroom report, an extended power headroom report, a dual connectivity power headroom report, or a combination thereof;
    a medium access control control element for a sidelink buffer status report excluding a sidelink buffer status report included for padding;
    data from a logical channel excluding data from an uplink common control channel;
    a medium access control control element for a recommended bit rate query;
    a medium access control control element for a buffer status report included for padding; and
    a medium access control control element for a sidelink buffer status report included for padding.

11. The method of claim 1, wherein the autonomous uplink confirmation has a relative transmission priority lower than:
    a medium access control control element for a data volume and power headroom report;
    data from a logical channel conveying delay-critical services;
    or some combination thereof.

12. The method of claim 1, wherein the autonomous uplink confirmation has a relative transmission priority lower than:
    a medium access control control element for a data volume and power headroom report.

13. The method of claim 1, wherein the reception of the autonomous uplink command triggers a scheduling request.

14. The method of claim 1, wherein the autonomous uplink command comprises an autonomous uplink deactivation command, and receiving the autonomous uplink command triggers a buffer status report.

15. An apparatus comprising:
    a receiver that receives an autonomous uplink command from a network unit;
    a processor that triggers an autonomous uplink confirmation in response to receiving the autonomous uplink command; and
    a transmitter that transmits the autonomous uplink confirmation to the network unit in response to triggering the autonomous uplink confirmation to indicate reception of the autonomous uplink command, wherein the autonomous uplink confirmation is transmitted via a medium access control control element, and the autonomous uplink confirmation has a relative transmission priority lower than:
        a medium access control control element for a cell radio temporary network identifier; and
        data from an uplink control channel.

16. The apparatus of claim 15, wherein the autonomous uplink confirmation has a higher transmission priority than:
    a medium access control control element for a buffer status report excluding a buffer status report included for padding;

a medium access control control element for a power headroom report, an extended power headroom report, a dual connectivity power headroom report, or a combination thereof;

a medium access control control element for a sidelink buffer status report excluding a sidelink buffer status report included for padding;

data from a logical channel excluding data from an uplink common control channel;

a medium access control control element for a recommended bit rate query;

a medium access control control element for a buffer status report included for padding; and a medium access control control element for a sidelink buffer status report included for padding.

17. The apparatus of claim 15, wherein the autonomous uplink confirmation has a relative transmission priority lower than:
a medium access control control element for a data volume and power headroom report.

18. A method comprising:
transmitting an autonomous uplink command to a remote unit, wherein the autonomous uplink command triggers an autonomous uplink confirmation; and
receiving the autonomous uplink confirmation in response to the autonomous uplink confirmation being triggered to indicate that the remote unit received the autonomous uplink command, wherein the autonomous uplink confirmation is received via a medium access control control element, and the autonomous uplink confirmation has a relative transmission priority lower than:
a medium access control control element for a cell radio temporary network identifier; and
data from an uplink control channel.

19. An apparatus comprising:
a transmitter that transmits an autonomous uplink command to a remote unit, wherein the autonomous uplink command triggers an autonomous uplink confirmation; and
a receiver that receives the autonomous uplink confirmation in response to the autonomous uplink confirmation being triggered to indicate that the remote unit received the autonomous uplink command, wherein the autonomous uplink confirmation is received via a medium access control control element, and the autonomous uplink confirmation has a relative transmission priority lower than:
a medium access control control element for a cell radio temporary network identifier; and
data from an uplink control channel.

* * * * *